United States Patent [19]
Ohmori et al.

[11] Patent Number: 5,766,354
[45] Date of Patent: Jun. 16, 1998

[54] SPIN-COATING DEVICE

[75] Inventors: Kazunori Ohmori; Kazuhiko Nagata; Hiroyuki Kosaka; Goroku Kitta; Kazumi Kuriyama, all of Yamanashi, Japan

[73] Assignees: Pioneer Electronic Corporation; Pioneer Video Corporation, both of Japan

[21] Appl. No.: 766,591

[22] Filed: Dec. 12, 1996

[30] Foreign Application Priority Data

Dec. 22, 1995 [JP] Japan ................... 7-350109

[51] Int. Cl.6 ................ B05B 13/02; B05B 3/00
[52] U.S. Cl. ............... 118/319; 118/52; 134/153
[58] Field of Search ............ 118/52, 319, 320; 134/902, 153; 269/21; 427/240; 438/782, 758; 15/302

[56] References Cited

U.S. PATENT DOCUMENTS

| 4,822,639 | 4/1989 | Fujii et al. | 118/52 |
| 5,095,848 | 3/1992 | Ikeno | 118/52 |

*Primary Examiner*—Laura Edwards
*Assistant Examiner*—Calvin Padgett
*Attorney, Agent, or Firm*—Fish & Richardson P.C.

[57] ABSTRACT

A spin-coating device comprises; a turntable for concentrically supporting a substrate; a spindle motor for rotating the turntable about a central axis thereof and connected via a rotating shaft thereto; a supply mechanism for feeding and dripping a fluid coating material onto the substrate; and a holding mechanism for maintaining that the central axis of rotation of the turntable carrying the substrate is placed to be inclined at a predetermined angle with respect to a gravitational direction while the fluid coating material is dripped onto the rotating substrate.

4 Claims, 5 Drawing Sheets

SPIN-COATING DEVICE

BACKGROUND OF THE INVENTION

1. Field of the Invention

The present invention relates to a spin-coating device is used for coating the substrate with a coating material such as a photoresist or the like.

2. Description of the Related Art

A master disc for replicating an optical disc such as a laser disc, a compact disc or the like is formed as shown in FIGS. 5A to 5E. A circular glass plate 1 is previously performed with a mirror-surface-treatment as shown in FIG. 5A. The surface of the glass plate 1 is coated with a photoresist 2 as shown in FIG. 5B. The layer of the photoresist 2 is irradiated with the laser light modulated in its intensity according to information signal to be recorded, as shown in FIG. 5C. After such an exposure of laser light, the glass plate 1 with the photoresist 2 is developed so as to form plural pits corresponding to information signal to be recorded, as shown in FIG. 5D. The plural pits are covered with a conductive layer 3 made of a metal such as Ni or the like, as shown in FIG. 5E. In this way, the master disc is formed.

In general, the photoresist layer 2 is spin-coated at approximately 0.1 to 0.2 micrometers. The thickness of the photoresist layer 2 defines the depth of each pit. Since the depth of each pit influences the characteristic of reproduction of the information signal in the reproducing system, the thickness of the photoresist layer 2 should be uniformly formed throughout the surface of the plate.

FIG. 6A shows a conventional spin-coating device used for coating a circular glass plate or substrate with a photoresist. This spin-coating device including a turntable 5 for supporting the glass plate 1 performed with the mirror-surface-treatment and a spindle motor 4 for rotating the turntable. The spin-coating device is provided with a spiner-box 6 at the peripheral of the turntable 5 which defines a work region of spin-coating. The spin-coating device further has a guiding tube 7 with a nozzle 8 for dripping a fluid photoresist on the glass plate 1 and placed over the opening of the spiner-box 6. The fluid photoresist supplied from a feeding source (not shown) is dripped through the nozzle 8 onto an internal peripheral of the rotating glass plate 1. The dripped fluid photoresist gradually spreads from the internal peripheral to the outer peripheral of the glass plate by the centrifugal force caused by the rotation thereof, so that it completely covers the surface of the rotating glass plate 1. After that, the glass plate 1 covered with the photoresist is heated and dried, so that the photoresist layer is formed on the glass plate 1. Such a glass plate 1 with the photoresist layer is used for the fabrication of the master disc as shown in FIG. 5B.

In the spin-coating device above mentioned, the centrifugal force does not have an effect on the fluid photoresist at the center and the adjacent thereto of the rotating glass plate 1. Therefore, the flowing status of the fluid photoresist is unstable at the center and the adjacent thereto of the rotating glass plate 1. As a result, the thickness distributions occur in the radial direction of the glass plate 1 as shown in FIGS. 6B and 6C which are a center dimple and a center protrusion respectively. In this way, it is difficult to uniformly form in thickness the photoresist layer 2 throughout the surface of the glass plate 1 without the thickness difference between the internal and outer peripherals.

SUMMARY OF THE INVENTION

It is therefore an object of the present invention is to provide a spin-coating device capable of coating a circular plate with a coating material (e.g., a fluid photoresist) at a uniform thickness.

The object is achieved by a spin-coating device according to the first aspect of the invention. The spin-coating device comprises; a turntable for concentrically supporting a substrate; a spindle motor for rotating the turntable about a central axis thereof and connected via a rotating shaft thereto; means for feeding and dripping a fluid coating material onto the substrate; and means for maintaining that the central axis of rotation of the turntable carrying the substrate is placed to be inclined at a predetermined angle with respect to a gravitational direction while the fluid coating material is dripped onto the rotating substrate.

In the spin-coating device according to the second aspect of the invention the spin-coating device, the coating material is dripped onto a portion adjacent to the central axis of the rotating substrate.

In the spin-coating device according to the third aspect of the invention the spin-coating device, the substrate does not have any central hole in a portion onto which the fluid coating material is dripped, and the spin-coating device further comprising a vacuumabsorption means for adsorbing the substrate to the turntable in such a manner that the substrate is fixed to the turntable during the rotation.

In the spin-coating device according to the fourth aspect of the invention the spin-coating device, the spin-coating device further comprising means for adjusting a slant angle of the central axis of the rotating substrate with respect to the gravitational direction.

Since the fluid coating material dropped onto the central portion of the rotating substrate spreads from the central portion toward the outer peripheral due to its self weight, the fluid coating material is uniformly formed throughout the surface of rotating substrate at a uniform thickness without staying the fluid coating material at the central portion thereof. This is because the spin-coating device of the invention comprises; a turntable for concentrically supporting a substrate; a spindle motor for rotating the turntable about a central axis thereof and connected via a rotating shaft thereto; means for feeding and dripping a fluid coating material onto the substrate; and means for maintaining that the central axis of rotation of the turntable carrying the substrate is placed to be inclined at a predetermined angle with respect to a gravitational direction while the fluid coating material is dripped onto the rotating substrate.

The above set forth and other features of the invention will be made more apparent in the ensuing Description of the preferred embodiments when read in conjunction with the attached Drawings.

DESCRIPTION OF THE PREFERRED EMBODIMENTS

Figure 1:
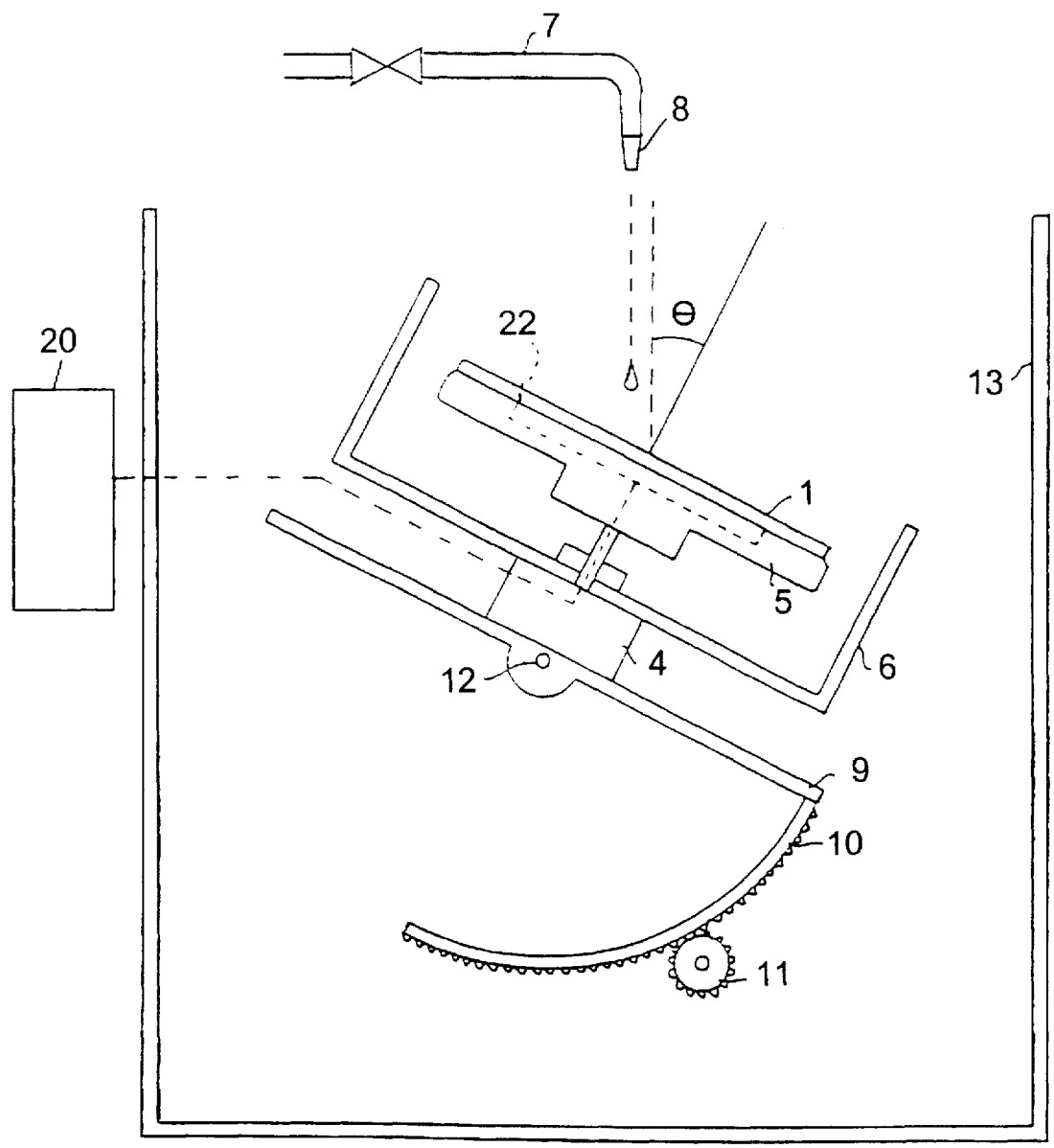
FIG. 1 is a schematic constructive cross-sectional view illustrating a spin-coating device of an embodiment according to the invention.

FIG. 1 shows a schematic constructive cross-sectional view of a spin-coating device of an embodiment according to the invention on the whole. Here, the parts of the embodiment being the same as those of the prior arts are denoted by the same numerals.

In FIG. 1, the spin-coating device includes an assembly comprises a turntable 5 secured to the rotating shaft of a spindle motor 4, and a spiner-box 6 fixed to the body of the spindle motor 4. Such a spin-coating assembly is securely attached to an operation plate 9. The operation plate 9 is provided with a gear plate 10 of a half circle for adjusting a slant angle of the central axis of the rotating substrate with respect to the gravitational direction. The gear plate 10 is engaged with a small gear 11 having a radius smaller than that of the gear plate for adjusting the slant angle of the operation plate 9. When the small gear 11 is driven by a pulse motor (not shown), the rotational speed of the operation plate 9 is reduced in comparison with than that of the small gear 11, so that the operation plate 9 is slowly rotated with respect to the fixed axis 12. Therefore, the operation plate 9 fixed to the gear plate 10 is inclined at an angle with respect to a gravitational direction. In other words, the spin-coating assembly secured to the operation plate 9 is adjustable by the inclination of the operation plate 9. Therefore, the turntable 5 per se can be set to a desired slant angle with respect to the gravitational direction. In this way, that the central axis of rotation of the turntable carrying the substrate is maintained in the status that it is placed to be inclined at a predetermined angle with respect to the gravitational direction while the fluid coating material is dripped onto the rotating substrate.

This spin-coating assembly is accommodated in an outer box 13. The spin-coating device further has a guiding tube 7 with a nozzle 8 placed over the opening of the outer box 13 in such a manner that the nozzle 8 drips the fluid coating material on the central portion of the glass plate 1 supported by the turntable 5 and. Therefore, the coating material is dripped onto a portion adjacent to the central axis of the rotating substrate. The fluid coating material is supplied via the guiding tube 7 from a feeding source (not shown). In addition, the spin-coating device further comprises a vacuum-absorption device 20 for absorbing air through holes 22 formed on the turntable 5 between the substrate 1 and the turntable 5 in such a manner that the substrate is fixed to the turntable. Further, the substrate does not have any central hole in a portion onto which the fluid coating material is dripped.

By using the spin-coating device above mentioned, various photoresist layers were formed on circular glass substrate plates with a 220-mm diameter respectively in such a manner that the central axis of every rotating substrate was changed with respect to the gravitational direction with the slant angle θ ranging from 0° to 35° and then the fluid coating material was dripped onto the rotating substrate. After that, the thickness distribution was measured by using the ellipsometer.

Figure 2:
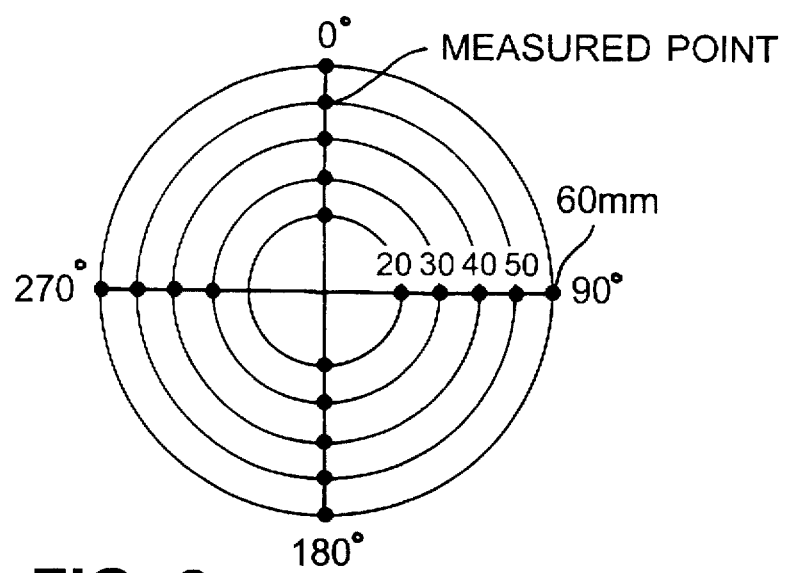
FIG. 2 is a plan view illustrating a glass plate.

As shown in FIG. 2, the thicknesses were measured at twenty intersection points of both the radial directions of the angles of 0°, 90°, 180° and 270° and the circumferences at the radial positions of 20, 30, 40, 50 and 60 mm on the glass plates respectively. The results of measurements are shown in the following Table 1.

TABLE 1

| Slant-angle | Angle-direction | Radius circumferences (mm) | | | | |
|---|---|---|---|---|---|---|
| | | 20 | 30 | 40 | 50 | 60 |
| 0° | 0° | 1678 | 1686 | 1695 | 1702 | 1703 |
| 0° | 90° | 1680 | 1689 | 1693 | 1699 | 1700 |
| 0° | 180° | 1683 | 1689 | 1698 | 1700 | 1712 |
| 0° | 270° | 1678 | 1689 | 1689 | 1699 | 1699 |
| 20° | 0° | 1711 | 1701 | 1706 | 1712 | 1714 |
| 20° | 90° | 1700 | 1698 | 1707 | 1713 | 1714 |
| 20° | 180° | 1696 | 1694 | 1699 | 1706 | 1703 |
| 20° | 270° | 1681 | 1694 | 1700 | 1705 | 1712 |
| 30° | 0° | 1713 | 1723 | 1730 | 1732 | 1730 |
| 30° | 90° | 1712 | 1718 | 1720 | 1719 | 1716 |
| 30° | 180° | 1706 | 1714 | 1719 | 1719 | 1717 |
| 30° | 270° | 1723 | 1721 | 1722 | 1713 | 1714 |
| 35° | 0° | 1708 | 1709 | 1712 | 1713 | 1711 |
| 35° | 90° | 1699 | 1704 | 1706 | 1707 | 1705 |
| 35° | 180° | 1698 | 1703 | 1706 | 1710 | 1707 |
| 35° | 270° | 1705 | 1707 | 1714 | 1713 | 1713 |

Unit: angstroms

Figure 3:
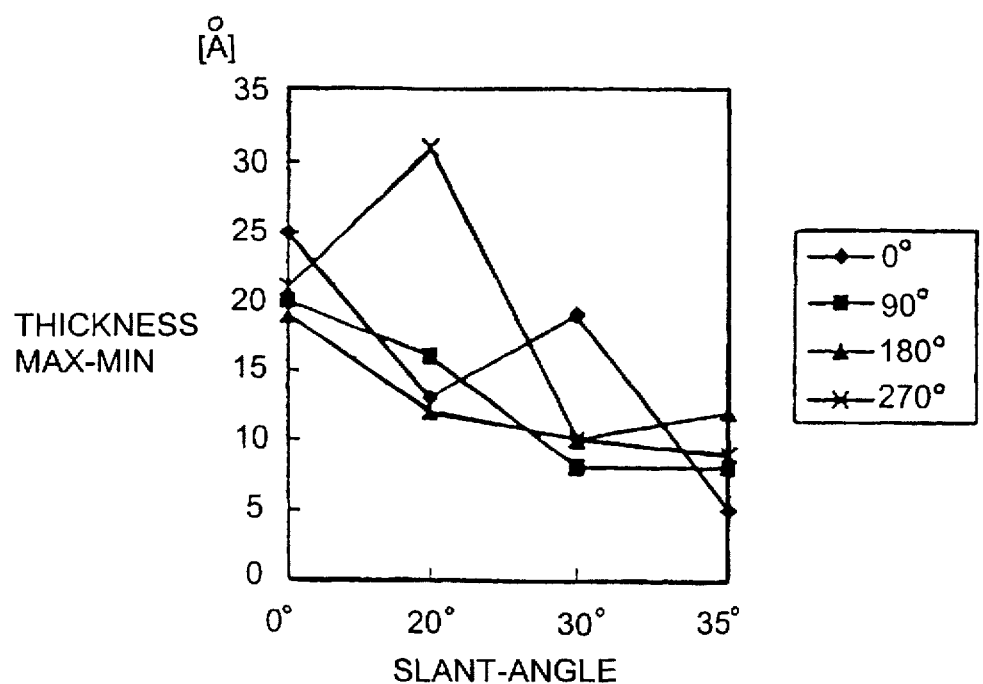
FIG. 3 is a graph showing a relationship between slant angles of the glass plate and distributions of thicknesses of coating materials in the radial direction thereof.

On the basis of the results in Table 1, the relationship of the tilted angle of the spin-coating assembly (slant angles θ are 0°, 20°, 30° and 35° versus the difference in thickness between maximum and minimum (thickness MAX–MIN) is plotted as a graph of FIG. 3 in which the thickness MAX–MIN represents the difference between thicknesses at the radial positions of 20 mm and 60 mm of each radial direction of the angles of 0°, 90°, 180° and 270°. As seen from FIG. 3, the more the tilted angle of the spin-coating assembly (the slant angle θ) increases, the less the thickness distribution in the radial direction decreases.

Figure 4:
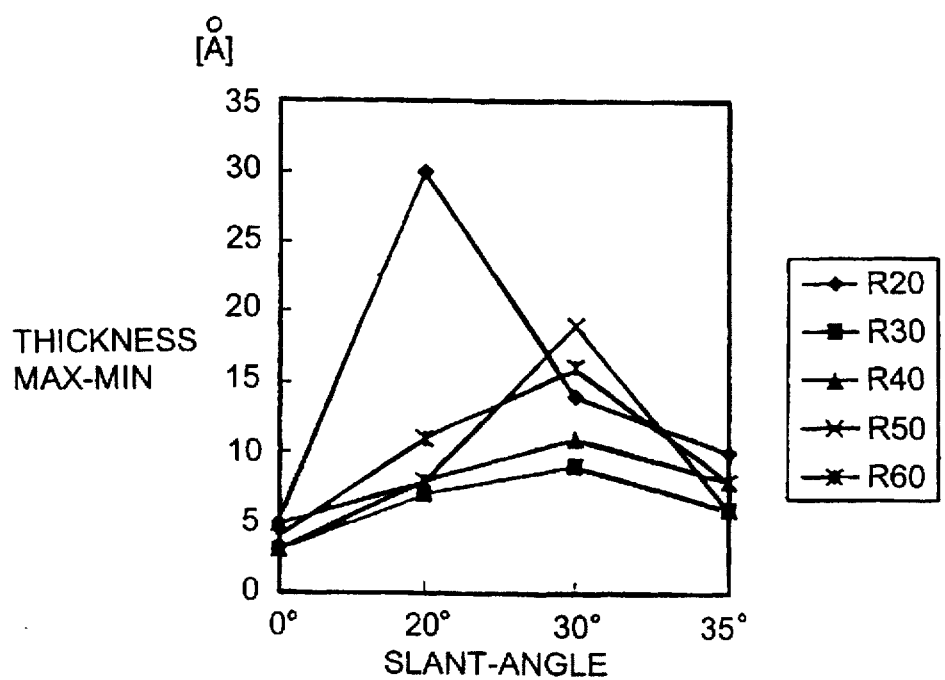
FIG. 4 is a graph showing a relationship between slant angles of the glass plate and distributions of thicknesses of coating materials at the circumferences thereon.
Figure 5A:
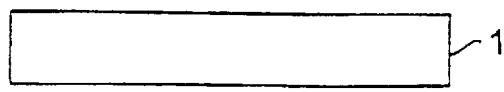
FIGS. 5A to 5E are cross-sectional views each illustrating a glass plate in the process for fabricating a master disc used for replication of the optical disc.
Figure 5B:
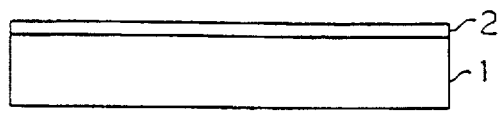
Figure 5C:
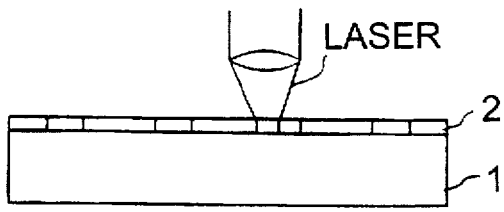
Figure 5D:
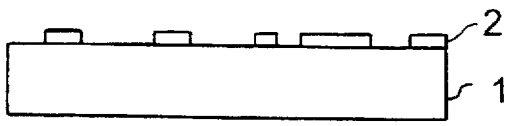
Figure 5E:
Figure 6A:
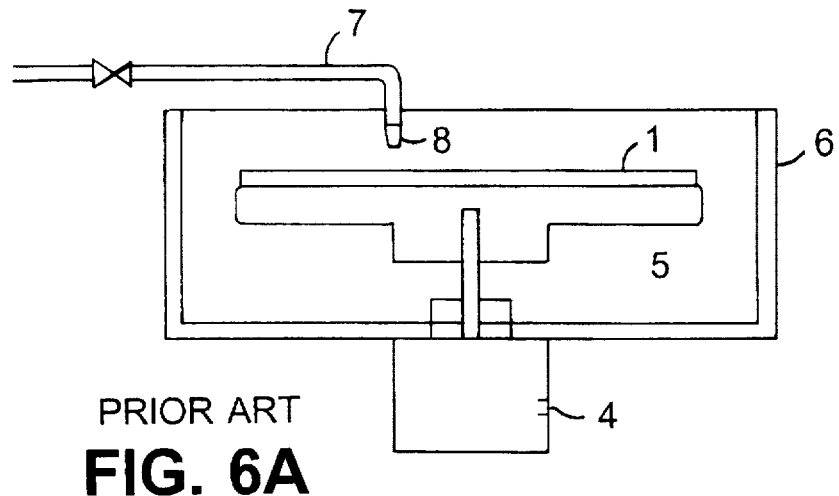
FIG. 6A is a schematic constructive cross-sectional view illustrating a conventional spin-coating device.
Figure 6B:
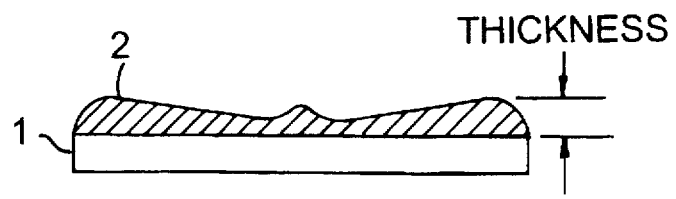
FIGS. 6B and 6C are cross-sectional views each illustrating a glass plate in a conventional process for fabricating a master disc used for replication of the optical disc.
Figure 6C:
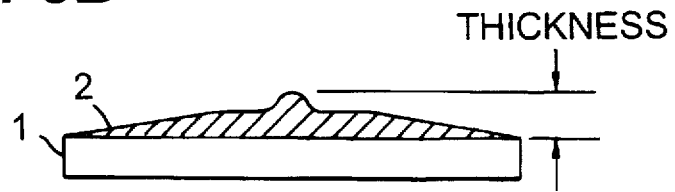

In addition, on the basis of the results in Table 1, the relationship of the tilted angle of the spin-coating assembly (the slant angles θ are 0°, 20°, 30° and 35°) versus the difference between maximum and minimum of thicknesses in each circumference at the radial positions of 20, 30, 40, 50 and 60 mm (thickness MAX–MIN) is plotted as a graph of FIG. 4.

As seen from FIG. 4, as the tilted angle of the spin-coating assembly (the slant angle θ) increases, the thickness differences at circumferences increase to the 30° slant angle and then the thickness distributions decrease after the 30° slant angle.

It is found from the above results that the change of the thickness distribution in the radial direction of the substrate can be reduced by dripping the fluid coating material on the rotating substrate having the central axis tilted with respected to the gravitational direction. This is because the fluid coating material dropped onto the central portion of the rotating substrate surely spreads from the central portion in which the centrifugal force does not have an effect thereto toward the outer peripheral due to its self weight in the spin-coating device. Therefore, the fluid coating material is uniformly formed throughout the surface of rotating substrate at a uniform thickness without staying the fluid coating material at the central portion of the substrate. In addition, the unstable flowing status of the fluid coating material is nonexistence at the center of the rotating substrate. As a result, the change of thickness distributions of coating material is reduced.

In addition, the slant angle of the spin-coating assembly can be suitably set according to the viscosity of the fluid coating material, the rotational speed of the turntable 4 and the like.

Moreover, although the above description is for a method of coating the substrate with the fluid photoresist as the embodiment, the invention is not only restricted by this embodiment.

In the above spin-coating device for coating the substrate with the coating materials, by maintaining that the central rotation axis of the turntable carrying the substrate is placed to be inclined at a predetermined angle with respect to a gravitational direction while the fluid coating material is dripped onto the rotating substrate, the fluid coating material dropped onto the central portion of the rotating substrate spreads from the central portion toward the outer peripheral due to its self weight. As a result, the fluid coating material is uniformly formed throughout the surface of rotating substrate at a uniform thickness without staying the fluid coating material at the central portion thereof.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A spin-coating device comprising:

a turntable for concentrically supporting a substrate;

a spindle motor having a rotating shaft connected to the turntable at a center thereof for rotating the turntable about a central axis thereof;

a nozzle disposed above the turntable for feeding and dripping a fluid coating material onto the substrate at a portion adjacent to said central axis of the rotating substrate; and an operation means onto which the spindle motor is securely attached, the operation means being configured to maintain an inclination of the central axis of rotation of the turntable carrying the substrate at a slant angle with respect to a gravitational direction while the fluid coating material is dripped onto the rotating substrate.

2. A spin-coating device according to claim 1, wherein said substrate does not have any central hole in a portion onto which the fluid coating material is dripped, and said spin-coating device further comprises a vacuum-absorption means for absorbing air through holes formed on the turntable to form a vacuum between the substrate and the turntable whereby said substrate is fixed to said turntable during the rotation.

3. A spin-coating device according to claim 2 wherein said operation means comprises an operation plate having a gear plate of a half circle which is engaged with a small gear having a radius smaller than that of the gear plate for adjusting the slant angle.

4. A spin-coating device according to claim wherein said operation means comprises an operation plate having a gear plate of a half circle which is engaged with a small gear having a radius smaller than that of the gear plate for adjusting the slant angle.

* * * * *